Dec. 17, 1957  R. P. SNODGRASS  2,816,724
CONSTANT LIFT FLIGHT PATH CONTROLLER
Filed Dec. 6, 1954  3 Sheets-Sheet 1
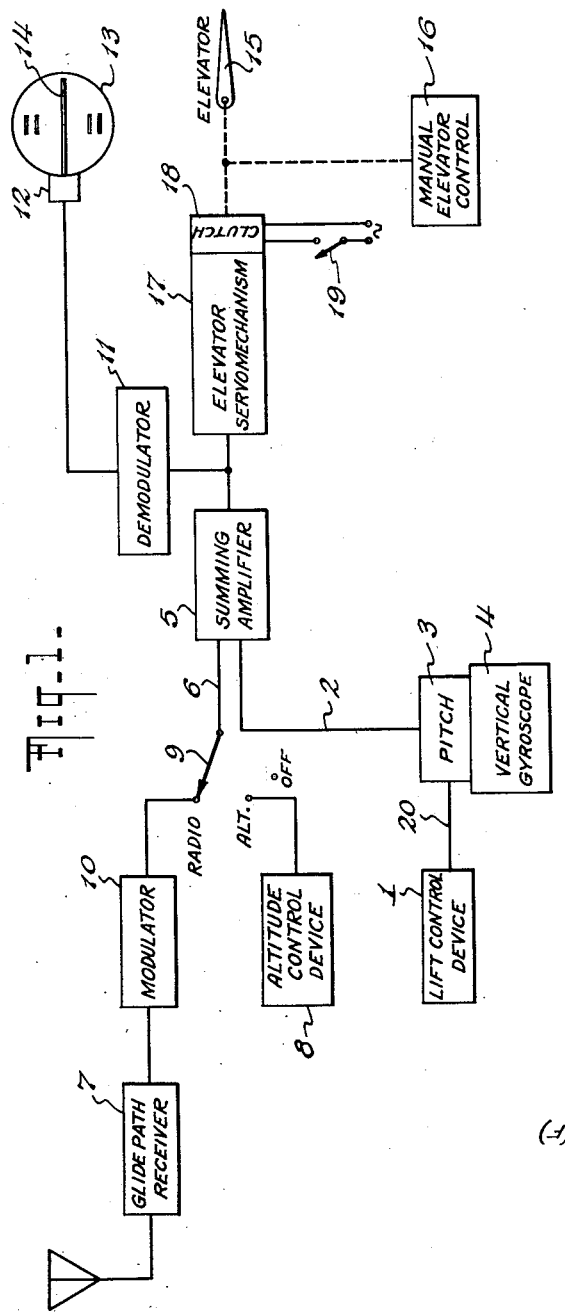
INVENTOR
REUBEN P. SNODGRASS
BY
ATTORNEY Dec. 17, 1957     R. P. SNODGRASS     2,816,724
CONSTANT LIFT FLIGHT PATH CONTROLLER
Filed Dec. 6, 1954                                                             3 Sheets-Sheet 2
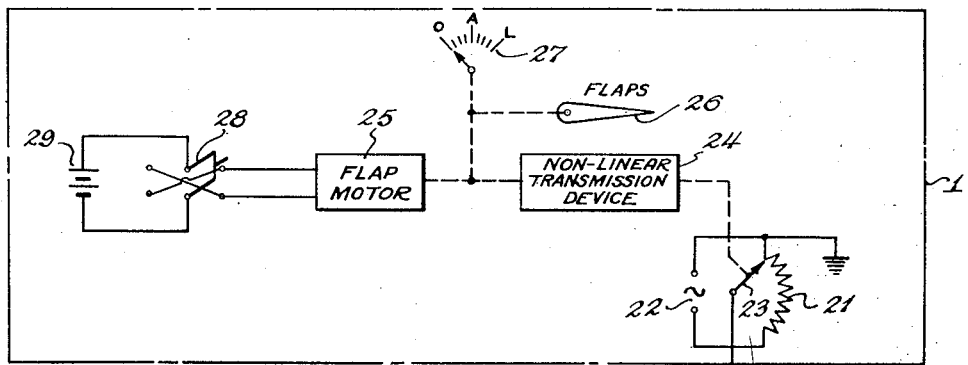
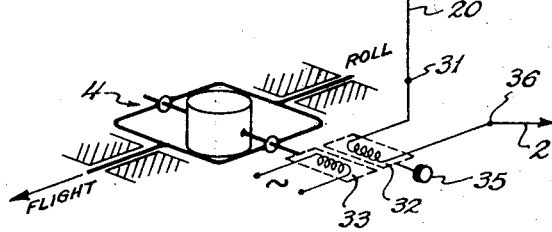
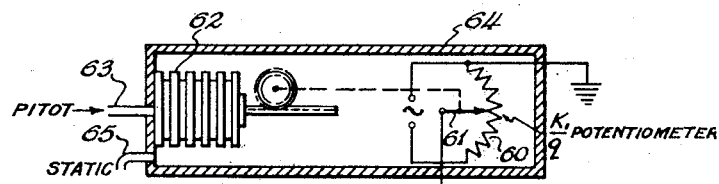
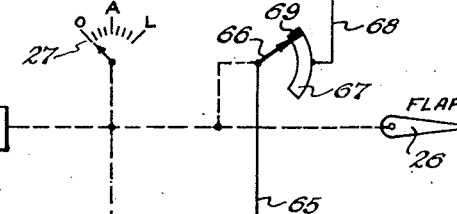
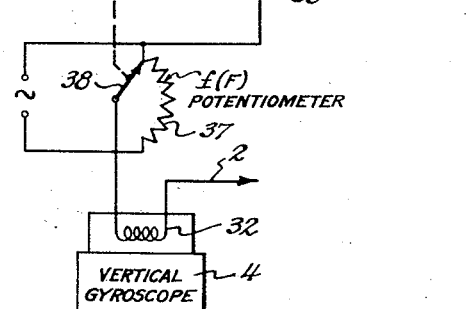
INVENTOR
REUBEN P. SNODGRASS
BY
ATTORNEY

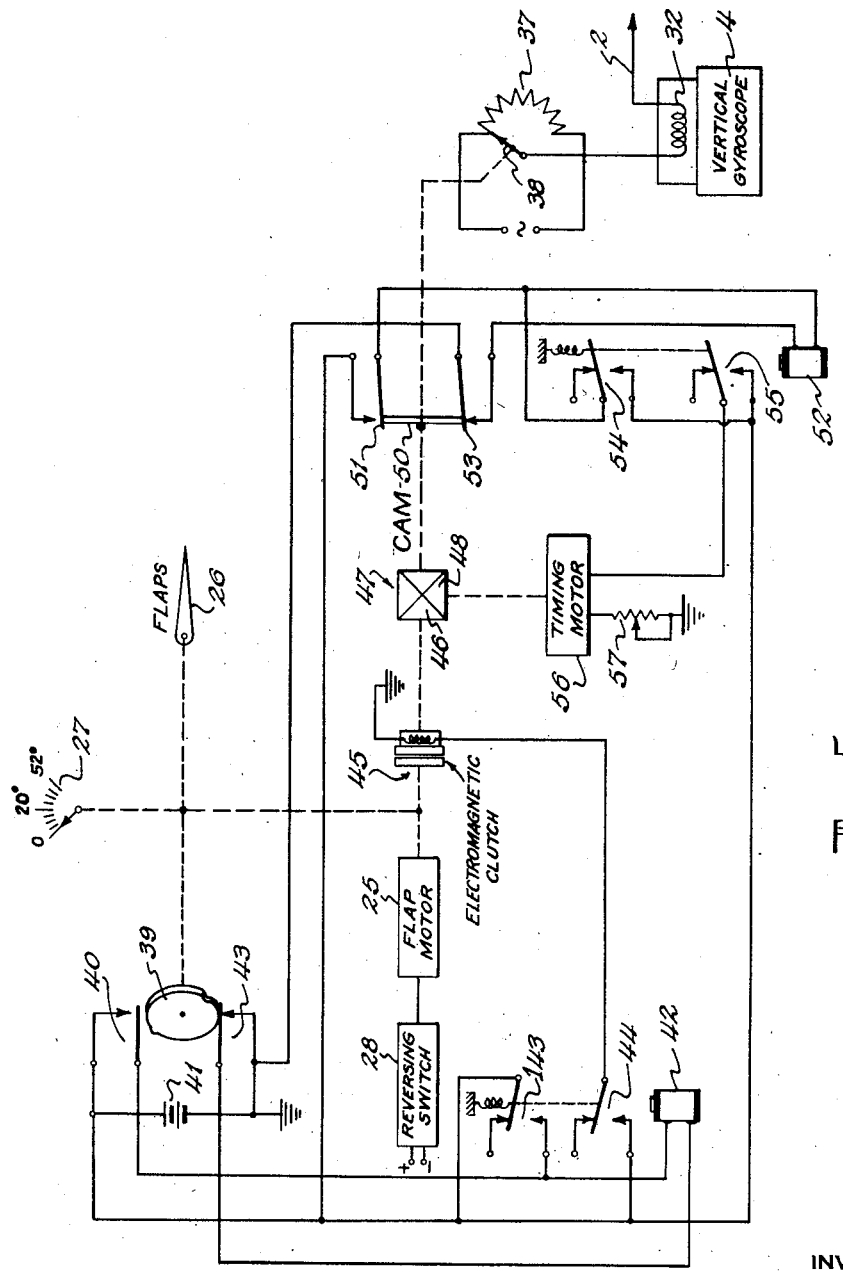

United States Patent Office 2,816,724
Patented Dec. 17, 1957

2,816,724

CONSTANT LIFT FLIGHT PATH CONTROLLER

Reuben P. Snodgrass, Lake Ronkonkoma, N. Y., assignor to Sperry Rand Corporation, a corporation of Delaware Application December 6, 1954, Serial No. 473,157

18 Claims. (Cl. 244—77)

My invention relates to the control of airplanes in elevation. More particularly, the invention concerns an improved arrangement by means of which an airplane, equipped with wing-flaps or other aerodynamic apparatus for altering the airplane's lift for a given angle of attack thereof and controlled in dependence upon its departure from a reference pitch attitude alone or in combination with its vertical displacement from a given flight path, may be prevented from experiencing lift transients due to the operation of such apparatus and due to changes in the airplane's air speed accompanying and/or following such operation.

A pitch attitude reference instrument is commonly employed to provide an indication anticipatory of the displacement of an airplane from a constant altitude flight path or a radio-defined flight path such as an ILS glide path. In this connection, a signal representing the departure of the airplane from a reference pitch attitude may be taken from a reference instrument such as a gyroscopic vertical and may be algebraically combined with a signal representing the vertical displacement of the airplane from a reference altitude or from a radio-defined glide path. The altitude displacement signal in such a case is usually taken from an altitude-responsive device such as a barometric or radio altimeter, while the glide path displacement signal is taken from a radio receiver tuned to the glide path transmission. The combination of one of the altitude or glide path signals with the pitch signal ordinarily represents a combination, respectively, of a displacement term with its first time derivative. And if the airplane is controlled to maintain this signal combination at null, either through the action of the pilot referring to a null indicator energized by the signal combination or through the action of an automatic pilot, the airplane will ordinarily be controlled to asymptotically approach the reference altitude or glide path and thereafter maintain the same.

While the airplane is cruising under altitude and pitch control, manually or automatically, its reference pitch is usually manually adjusted to coincide with the angle of attack at which the craft must fly in order to maintain its lift equal to its weight. With this pitch reference the reference altitude will be maintained. From time to time, as changes in air speed are incurred and/or fuel is consumed and the airplane's gross weight thereby diminishes, the pitch reference is further adjusted in accordance with consequent changes in the requisite angle of attack. Usually, however, the changes in air speed that occur under altitude control (cruise condition) do not warrant a change of pitch reference adjustment, since small variations from cruising air speed ordinarily have little effect on the required angle of attack.

Assuming no change in air speed, when the airplane is shifted from altitude and pitch control to glide path and pitch control, the pitch reference is generally altered an amount equal to the angle of incidence of the glide path with the landing field (usually about 2½°). Then, while the airplane is yet several miles from the runway and is slowing for the approach, the pitch reference is often again manually adjusted to maintain constant lift on the glide path. This adjustment now is primarily to correct for the change in air speed, since the reduction in air speed, in this instance, is sufficiently great to substantially adversely affect the lift of the airplane. In fact, at the reduced or approach speed, even small variations in air speed substantially affect airplane lift.

At the reduced air speed on approach, the pilot operates the aerodynamic apparatus with which the airplane is equipped for altering the airplane's lift vs. angle of attack characteristic. As earlier noted, this apparatus may comprise wing-flaps, for example, in which event the flaps are extendable from the trailing edges of the wings, or, in some cases, from both the trailing and leading edges of the wings. Upon being extended, the flaps enable the airplane to be flown at relatively low air speeds while maintaining a margin of safety between the airplane's actual angle of attack and the angle of attack at which stalling and consequent loss of control is apt to occur.

Other aerodynamic apparatus for this purpose may include devices for decreasing the sweep back angle of the wings or devices for rotating the wings about their athwartship axes or even devices for extending the wings out from the fuselage. Moreover, such devices may be employed together with flaps so that the effect of one complements the other. Whatever the form of the apparatus, its operation will change the aerodynamic configuration of the airplane and increase the lift of the airplane's wings; hence, through the use of such apparatus, a given lift occurs at a lower angle of attack for the airplane than would otherwise be the case.

Because the extension of flaps or the operation of the other aerodynamic apparatus described increases lift, the pilot must again adjust the pitch reference in order for the combined pitch and glide path signals to call for a constant lift flight path corresponding to the glide path. However, the timing of the pitch adjustment in relation to the change in lift now becomes extremely significant. That is to say, while far out on the glide path, and, before that, while under altitude control, it is generally acceptable for the pitch reference adjustment to occur after the change in lift—but while close in on the glide path where altitude is relatively low and where tight control is essential for the sake of safety, it becomes important to make the pitch reference adjustment at substantially the same time as the change in lift tends to occur. Otherwise, the normally rapid operation of the aerodynamic apparatus in an increased lift sense would bring about a sharp lift transient generally termed "ballooning," by which the airplane rises from the desired flight path with substantially no immediate pitch attitude change. This would occur notwithstanding a further reduction in air speed brought about by a reduction in engine power or by the drag-derived air braking property of extended flaps. And in view of the low and steadily decreasing altitude at which these events would ordinarily take place, it is obvious that there is little margin for the pilot to make an error in judgment were he to attempt to simultaneously introduce a pitch reference change estimated by him to prevent the lift transient.

A similar situation demanding immediate action to prevent a dangerous lift transient occurs when the pilot decides to execute a go-around maneuver. In this instance, the aerodynamic apparatus is operated in a decreased lift sense and constant altitude control may be substituted until sufficient air speed is gained for climb-out. However, unless the pitch reference is substantially simultaneously changed with such operation (flap retraction) to compensate for the consequent loss in lift, a sharp transient termed "settling" is apt to occur, by which the aircraft drops toward the runway at least until an altitude displacement signal is generated calling for a climb toward the reference altitude. Again, there is a prohibitively small margin for error in any attempt by the pilot to prevent the lift transient by simultaneously introducing an estimated pitch reference change.

Accordingly, it is an object of my invention to provide an arrangement for automatically supplying the pitch reference adjustments requisite for an airplane under pitch attitude control, manually or automatically, to maintain a constant lift flight path.

Another object is to provide the foregoing automatic adjustments in a manner preventing the occurrence of lift transients due to changes in the airplane's aerodynamic configuration and air speed.

Another object is to provide, in an airpalne equipped with aerodynamic apparatus for altering the airplane's lift for a given angle of attack, a pitch reference adjustment dependent on the extent of operation of said apparatus alone or in combination with a function of air speed induced dynamic pressure as actually measured or as predicted from normal operational procedure for flight.

Another object is to provide an improved arrangement by which any tendencies of a flap-equipped airplane to "balloon" from its flight path and to "settle" therefrom due to the extension and retraction, respectively, of its flaps may be nullified.

With the foregoing and still other objects in view, my invention includes the novel combinations and arrangements of elements described below and illustrated in the accompanying drawings, in which Fig. 1 is a block diagram of an airplane control system to which my invention may be applied;

Fig. 2 is a curve illustrating the change in the zero lift angle of one type of airplane due to the extension of wingflaps;

Fig. 3 is a schematic diagram of one arrangement for producing a lift correction in accordance with my invention;

Fig. 4 is a curve illustrating a desired variation in lift control signal for another type of airplane plotted against flap position and time; and Figs. 5 and 6 are, respectively, schematic diagrams of other arrangements for producing a lift correction in accordance with my invention.

Before proceeding with a description of the various embodiments of my invention, I shall first set forth the mathematical basis for the present concept, including a derivation of the quantities that govern the amount of pitch reference adjustment required to achieve the foregoing objects.

For illustrative purposes, it will be assumed that the airplane is being controlled to fly down a radio-defined glide path. The control may be executed by the pilot by his maneuvering of the airplane in elevation so that an indicator responsive to the algebraic sum of glide path displacement and pitch attitude departure signals indicates this sum to be zero. Such an arrangement is fully disclosed in U. S. Patent No. 2,613,350. On the other hand, the control may be executed by an atuomatic pilot which automatically maneuvers the airplane to maintain the aforesaid algebraic sum at a value of zero. An automatic pilot of this type is fully disclosed in U. S. Patent No. 2,613,050. In either case, the equation defining performance in elevation is as follows:

(1) $$P - P_R = D$$

where $P$ = pitch
$P_R$ = reference pitch
$D$ = glide path displacement

Equation 1 illustrates that if the airplane is vertically displaced from the glide path, elevator control will be called for to change the pitch attitude of the airplane from its reference value until a signal representing the difference between the new pitch and the reference pitch equals a signal representing the glide path displacement.

As long as the reference pitch attitude is the attitude at which the airplane must fly in order to maintain a straight flight path parallel to the glide path when no radio signal is available, the airplane controlled in accordance with Equation 1 will be asymptotically returned to the glide path, at which time the glide path displacement will be zero, as follows:

(2) $$P - P_R = 0$$
$$P = P_R$$

However, the fundamental quantity defining the direction of flight in the vertical plane is flight path angle, not pitch attitude. Flight path angle is the angle formed between the pitch attitude of an airplane and the airplane's angle of attack, i. e., (3) $$G = P - A$$

where $G$ = flight path angle
$P$ = pitch
$A$ = angle of attack

Equation 3 illustrates that if angle of attack is not constant, then pitch $P$ must be varied in order to maintain flight path angle $G$ constant, hence maintain the airplane on a straight flight path.

Now, for constant flight path angle, the lift of the airplane must equal its weight (assuming that small flight path angles and a load factor of 1 are normally encountered in airplanes). Thus, (4) $$W = L = q C_L S$$

where $W$ = weight
$L$ = lift
$q$ = dynamic pressure
$C_L$ = lift coefficient
$S$ = wing area Lift coefficient $C_L$ may also be expressed in terms of angle of attack, as follows:

(5) $$C_L = m_{LA}(A - A_{LO})$$

where $m_{LA}$ = slope of the lift coefficient vs. angle of attack curve for the airplane; $A$ = angle of attack; $A_{LO}$ = angle of zero lift of the airplane.

Substituting Equation 5 in Equation 4, the following expression is obtained for the angle of attack:

(6) $$A = \frac{W}{q m_{LA} S} + A_{LO}$$

Substituting Equation 6 in Equation 3, the expression for flight path angle $G$ is as follows:

(7) $$G = P - \left[\frac{W}{q m_{LA} S}\right] + A_{LO}$$

And in the case where the airplane is controlled to satisfy Equation 2 and it is desired to maintain the flight path angle $G$ constant, Equation 7 may be written as follows:

(8) $$P_R = G_R + \left(\frac{W}{q m_{LA} S} + A_{LO}\right)$$

where $G_R$ = constant reference flight path angle.

It is apparent from Equation 8 that a change in the bracketed portion thereof requires a change in the reference pitch attitude $P_R$, if the given flight path angle $G_R$ is to be maintained. According to my invention, therefore, changes in reference pitch attitude are effected in dependence upon changes in the aforesaid bracketed portion.

Assuming the aerodynamic apparatus that alters the lift of the airplane for a given angle of attack consists of wing-flaps, then slope $m_{LA}$ and wing area S will remain constant; and, of course, weight W will remain essentially constant. Accordingly, in this instance, Equation 8 may be simplified as follows:

(9) $$P_R = G_R + \left(\frac{K_1}{q} + A_{LO}\right)$$

where $$K_1 = \frac{W}{m_{LA}S}$$

In carrying out my invention in a flap-equipped airplane, therefore, a signal proportional to angle of zero lift $A_{LO}$ is generated by an arrangement responsive to flap position, since changes in $A_{LO}$ are primarily caused by changes in flap position. That is to say, the angle of zero lift of the airplane may be expressed as follows:

(10) $$A_{LO} = A_{LO/F=0°} + f(F)$$

where $A_{LO/F=0°}$ = angle of zero lift at zero flap deflection = a constant, $K_2 f(F)$ = change in angle of zero lift for a flap position F.

Substituting Equation 10 into Equation 9, the following expression for reference pitch attitude $P_R$ results:

(11) $$P_R = G_R + \left[\frac{K_1}{q} + f(F)\right] + K_2$$

Thus, it is apparent from Equation 11 that a signal which is a function of flap position F may be employed for angle of zero lift $A_{LO}$.

Further in carrying out my invention in a flap-equipped airplane, the $$\frac{K_1}{q}$$

term in Equations 9 and 11 is treated alternatively in three principal ways, as follows:

(a) For a case where the airplane under control experiences slight changes in a given operational air speed due to the extension and retraction of flaps, or where the airplane experiences its principal change in operational air speed simultaneously with flap operation, the $$\frac{K_1}{q}$$

term is treated as a constant. Hence, in this case, a fixed adjustment of the signal level of the $A_{LO}$ or $f(F)$ term provides the requisite recognition of the effect of air speed on the pitch reference adjustment necessary to maintain constant lift.

(b) For a case where the airplane under control experiences significant known changes in a given operational air speed following flap operation, the $$\frac{K_1}{q}$$

term is treated as a constant during the brief interval of flap operation, and thereafter, is treated as a variable of known variation with respect to time. Accordingly, in this case, a timing device is employed to bring about a given continuous variation in the signal level of the $A_{LO}$ or $f(F)$ term over a given period of time following the operation of the flaps.

(c) Lastly, for a general case fitting all control situations, including the above where the $$\frac{K_1}{q}$$

term is predicted from operational procedure, the $$\frac{K_1}{q}$$

term is actually derived as an independent signal from an air speed-responsive device, and together with the $A_{LO}$ or $f(F)$ signal is employed to modify the reference pitch $P_R$.

Thus, in a flap-equipped airplane, the reference pitch is changed as a function of flap position and air speed, predicted or measured. If, however, besides being equipped with flaps, the airplane is provided with a device for rotating the wings about an athwartship axis, and the vertical gyroscope providing the pitch information is located in the fuselage, the $A_{LO}$ term of Equation 9 is then provided by a signal dependent both on flap position and the inclination of the wings with respect to the fuselage, since a change in wing inclination produces a change in $A_{LO}$. Similarly, if the airplane has flaps and also a device for varying the extension of the wings, the $A_{LO}$ term is provided by a signal dependent both on flap position and wing extension, since a change in the latter produces a change in $A_{LO}$. On the other hand, if the airplane, besides having flaps, is provided with a device for varying the sweep back of the wings, the $A_{LO}$ term is made a function of flap position only, while the $$\frac{K_1}{q}$$

term of Equation 11 is made a function not only of predicted or measured dynamic pressure $q$, but also of measured sweep back angle, since the $m_{LA}$ portion of $K_1$ varies as a function of such angle.

The general arrangement of elements shown in Fig. 1, with the exception of the element designated as a lift control device 1, forms a known system by which the pitch attitude of an airplane may be controlled in dependence upon both the vertical displacement of the airplane from a selected flight path and its departure from a reference pitch attitude.

A pitch departure signal is supplied to a lead 2 by a signal generator 3 on the pitch axis of a gyroscopic vertical 4. This signal may be algebraically combined in a summing amplifier 5 with a flight path displacement signal on a lead 6 supplied, as a matter of choice, from either a glide path receiver 7 or an altitude control device 8, depending on the actuation of a three-position switch 9.

If the flight path desired to be flown is defined by a radio glide path, switch 9 is operated to its "Radio" position, as shown. On the other hand, if the desired flight path is to be of a constant altitude, then switch 9 is operated to its ALT position. An "off" position is also provided for uncoupling the system completely from the radio beam or altitude sensor in the event the pilot should prefer to mentally perform the summation function of amplifier 5.

A modulator 10 is provided in the output of glide path receiver 7 before switch 9 to convert the normally direct-current output thereof to a proportional phase-reversing alternating-current signal of the same general nature as the output of altitude device 8.

The output of summing amplifier 5, representing the algebraic sum of the pitch departure signal and one of the flight path displacement signals, is fed via a demodulator 11 to energize the coil 12 of a meter-like null indicator 13 preferably having a horizontal bar 14 positioned by coil 12 from a center null or zero position. By this arrangement, if the pilot manually controls the airplane's elevator 15 through a manual control device 16 to maintain bar 14 centered, hence maintain the algebraic sum of the flight path displacement and pitch departure signals equal to zero, the airplane will asymptotically approach the flight path and thereafter remain on the same, providing that the reference pitch attitude corresponds to the attitude that the airplane must maintain to fly parallel to the flight path in the absence of a displacement signal.

Besides having provided for manual control of the airplane in accordance with the algebraic sum of flight path displacement and pitch departure signals, I have provided for automatic control in accordance with the same quantities. That is to say, the output of summing amplifier 5 is also fed controlwise to the input of an electrical servomechanism 17, mechanically connected in its output to position elevator 15 through an electrically-operated clutch 18. By closing a single-pole single-throw switch 19, thereby to energize clutch 18 from a suitable power source, elevator 15 is positioned automatically to control the airplane to maintain the selected flight path.

My invention concerns the addition to the system, as thus far described, of the lift control device 1 which provides an output signal on lead 20 for adjusting the reference pitch attitude of the system so that the airplane is prevented from experiencing the lift transients due to the operation of its lift-changing aerodynamic apparatus and due to changes in its air speed accompanying and/or following the operation of such apparatus.

From Equation 9, it was seen that the requisite adjustment of reference pitch attitude is a function of the airplane's angle of zero lift and the air speed-induced dynamic pressure. It was then developed for the case of the flap-equipped airplane that changes in the airplane's angle of zero lift are caused by changes in flap position, and that a signal which is a function of flap position may be employed to represent angle of zero lift, as shown in Equation 11.

In Fig. 2, I have plotted the change in angle of zero lift for a typical airplane against the position of the airplane's flaps. It is seen from the resultant curve that as the flaps are extended, the angle of zero lift changes non-linearly in a negative direction. That is to say, the angle of attack at which the airplane experiences zero lift becomes more nose-down as the flaps are extended.

In Fig. 3, I have shown one of the several forms that lift control device 1 (Fig. 1) may take in accordance with my invention. This form produces a signal output that varies with flap position as the change in angle of zero lift varies. To obtain the signal, a variable potentiometer has its winding 21 connected across a source of alternating current 22, one side of which is grounded. The wiper arm 23 of the potentiometer is mechanically connected through a non-linear transmission device 24 to the shaft of a reversible electrical motor 25 which is also connected to position flaps 26 and to operate an indicator 27 showing flap position.

A double-pole double-throw reversing switch 28 connected between motor 25 and a battery 29 controls the extension and the retraction of flaps 26 depending on the direction in which the switch is thrown by the pilot. Non-linear device 24 comprises any suitable cam arrangement, for example, whereby wiper arm 23 is driven non-linearly with respect to flaps 26 in accordance with the curve plotted in Fig. 2. Hence, assuming that the potentiometer itself is of the linear type, a signal is developed between wiper arm 23 and ground that varies with flap position as the change in angle of zero lift varies.

The signal of wiper arm 23 is fed via lead 20 to a terminal 31 of one winding 32 of a variable transformer pick-off having its other winding 33, which is energized from a source of alternating current, connected rotatably to the pitch axis of gyroscopic vertical 4. In order to obtain a manual adjustment of the reference attitude about which the pick-off detects pitch attitude departures of the airplane, I have provided a knob 35 mechanically connected to rotate winding 32. The other terminal 36 of winding 32 is connected via lead 2 to summing amplifier 5 (Fig. 1), thus completing a series combination of the potentiometer and pick-off signals in the amplifier input.

The relative phasing of the flap-derived potentiometer signal and the pitch pick-off signal is such that the latter is always reduced by an amount equal to the former. That is to say, upon extension of flaps 26 while the airplane is flying at its reference pitch attitude and the pitch pick-off signal therefore is zero, a net signal nevertheless will appear between lead 2 and ground as if the reference pitch attitude had been made more nose down. Hence, the reference pitch attitude is electrically adjusted as a function of flap position, and the net signal on lead 2 is reduced to zero when the airplane is maneuvered into the adjusted reference pitch attitude.

The form of lift control device 1, just described in connection with Fig. 3, is most suitable for an airplane, the air speed of which upon flap extension is known from operational procedure and which either changes slightly during or after flap extension or changes principally during flap extension. As pointed out earlier, the $$\frac{K_1}{q}$$

term of Equations 9 and 11 in such a case may be treated as a constant, in which event no separate means is required to supply a further pitch reference adjustment for $$\frac{K_1}{q}$$

besides that supplied for $f(F)$ or $A_{LO}$ by potentiometer 21.

There are airplanes, however, where the air speed materially changes from one known operational value to another known value over a given time period extending beyond the time the flaps are set at their desired position. A lift control signal suitable for adjusting the reference pitch attitude of such an airplane would be of the form shown in Fig. 4 plotted as a function of flap position and time. Fig. 4 assumes that the reference pitch attitude to be adjusted is the attitude that produces constant lift with flaps extended partially to a 20° position, this flap position being commonly employed for the approach configuration of airplanes as distinguished from their full-flap landing configuration.

Fig. 5 illustrates a form of the lift control device of Fig. 1 which will produce an output signal for adjusting the reference pitch attitude in accordance with the signal curve of Fig. 4.

In Fig. 5, a signal generator is connected in circuit with the pitch pick-off winding 32 in the same manner as shown in Fig. 3 for adjusting the reference pitch attitude of the system. Instead of employing a non-linear transmission device in the actuating connection to a linear type potentiometer, however, I prefer to substitute a generally equivalent non-linear function potentiometer 37 which is wound to produce the desired signal in accordance with the position of its wiper arm 38.

For flap positions from zero degrees to 20 degrees, wiper arm 38 remains at its zero output position. However, just as the flaps are positioned beyond 20°, a cam 39 driven by flap motor 25 momentarily closes a normally-open switch 40, one terminal of which is connected to the positive side of a battery 41, the other terminal of which is connected through the winding of a relay 42 and a normally-closed switch 43 to the negative side of battery 41 and ground. Thus, relay 42 is energized, and a holding switch element 143 forming part of relay 42 is closed to by-pass cam-operated switch 40, thereby to maintain the energization of the relay.

The energization of relay 42 closes another of its switch elements, 44, which connects the positive side of battery 41 to one of the winding terminals of an electromagnetic clutch 45, the other terminal of which is connected to ground. Thus energized when the flaps are moved beyond their 20° position, clutch 45 mechanically engages the shaft of flap motor 25 to one of the input sides 46 of a mechanical differential 47, the other input side 48 being locked by gearing friction at this time against rotation. The output side of differential 47 is mechanically connected to move wiper arm 38 of potentiometer 37. Hence, wiper arm 38 is first set into motion by the flap motor when the flaps are extended beyond their 20° position.

Wiper arm 38 continues to be driven solely in accordance with flap position until the flaps reach their full extension, say 52°. Hence, during the interval in which the flaps are operated from their approach position to their landing position, a potentiometer signal is generated which varies non-linearly with flap position. Potentiometer 37 is so wound as to produce the non-linearly changing lift control signal shown in Fig. 4 plotted against flap position.

At full flap position, a cam 50 in the connection between differential 47 and wiper arm 38 momentarily closes a normally-open switch 51, one terminal of which is connected to the positive side of battery 41, the other terminal being connected through the winding of a relay 52 and a normally-closed switch 53 to ground. Thus, relay 52 is energized, and a holding switch element 54 forming part thereof is closed to by-pass cam-operated switch 51, thereby to maintain the energization of relay 52.

The energization of relay 52 closes another of its switch elements, 55, which connects the positive side of battery 41 to one of the terminals of a timing motor 56, the other terminal of which is connected through a speed-controlling rheostat 57 to ground. The shaft of motor 56 is geared to drive the other input side 48 of differential 47. Hence, at the moment the flaps reach their full extension, motor 56 functions through differential 47 to drive wiper arm 38 back toward its zero output position at a rate proportional to the speed of the motor, as determined by the setting of rheostat 57.

When motor 56 has driven wiper arm 38 a predetermined distance, cam 50 momentarily opens switch 53, thereby to deenergize relay 52 and consequently stop motor 56. Cam 50 is so designed and speed control rheostat 57 is so set that the lift control signal supplied from potentiometer 37 is reduced a given amount in a preselected duration of time, whereby the signal is of the form shown in Fig. 4 plotted against time.

In order to recycle the apparatus of Fig. 5, flaps 26 are retracted by an appropriate manual operation of reversing switch 28. At a flap position of less than 20°, such as a 15° flap position, cam 39 momentarily opens switch 43, thereby to deenergize relay 42, hence to disengage electromagnetic clutch 45. The resetting of potentiometer 37 to its zero output position automatically occurs during flap retraction.

The ability of the arrangements in Figs. 3 and 5 to provide their best possible adjustment of the pitch attitude reference for preventing lift transients due both to flap operation and the air speed changes that accompany and/or follow such operation depends on the observance by the airplane's pilot of a given operational procedure. That is to say, for best results, the pilot should extend the airplane's flaps at the speeds which form the bases for the predicted values of $$\frac{K_1}{q}$$

inserted into the pitch reference adjustment of these arrangements.

In the arrangement of Fig. 6, however, the pilot of the airplane is freed of having to observe a given operational procedure for best results, since the $$\frac{K_1}{q}$$

term is actually measured by an air speed-responsive device instead of being predicted. Accordingly, in Fig. 6 I have provided a non-linear function potentiometer 60 having a wiper arm 61 adapted to be rotatably driven by the movable end of Sylphon bellows 62, the interior of which receives air speed-induced dynamic pressure through a Pilot tube 63. Potentiometer 60 and bellows 62 are enclosed and supported in a container 64, the interior of which is supplied with static pressure through a static tube 65. By this arrangement, wiper arm 61 is positioned in accordance with the dynamic pressure $q$, hence in accordance with the square of the air speed. Moreover, the winding of potentiometer 60 is connected across a source of alternating current, one side of which is grounded so that a signal output appears between wiper arm 61 and ground depending on the position of the former. Hence, by winding the potentiometer 60 to yield a signal output inversely proportional to the position of its wiper arm 61, I obtain an output directly proportional to the $$\frac{K_1}{q}$$

term of Equations 9 and 11.

The $A_{LO}$ or $f(F)$ term for the above equations is provided in Fig. 6 by the non-linear function potentiometer 37 (Fig. 5) arranged in this instance to be actuated directly by flap motor 25. Again, the end terminals of potentiometer 37 are connected to a source of alternating current for energization purposes, but instead of one of these terminals being directly connected to ground, such terminal is connected via a lead 65 to a sliding contact 66 cooperating with a fixed contact segment 67 connected via a lead 68 to wiper arm 61 of the $$\frac{K_1}{q}$$

potentiometer 60. Contactor 66 is arranged to be driven off a dead segment 69 onto contact segment 67 by flap motor 25 as soon as flaps 26 are extended from their zero degree position. This completes a series connection of the signal outputs of potentiometer 60, potentiometer 37 and gyroscope pick-off winding 32, whereby the reference pitch attitude is adjusted in accordance with the functions of dynamic pressure and flap position represented by the potentiometer signals. The relative phasing of the potentiometer signals is such that the $$\frac{K_1}{q}$$

signal subtracts from the $A_{LO}$ or $f(F)$ signal.

It will be noted that the arrangements illustrated in Figs. 3 and 6 are suitable not only for varying the reference pitch attitude when the airplane is extending its flaps, as during a landing approach, but also are suitable when the airplane is retracting its flaps, as during a missed-approach or go-around maneuver. In either case, the reference pitch attitude will be suitably adjusted to prevent the airplane from experiencing lift transients, such as ballooning on one hand and settling on the other.

The arrangement illustrated in Fig. 5, however, is depicted for purposes of simplicity as a non-reversible system for adjusting the reference pitch attitude during a landing approach only. Nonetheless, it is readily apparent that by substituting a reversible timing motor for timing motor 56 (Fig. 5) and suitably modifying the switching controls associated therewith, a pitch reference adjustment as a function of flap position and time may be obtained for flap retraction as well as for flap extension.

While the specific embodiments thus far described employ flap apparatus for bringing about a change of lift for a given angle of attack, it will be recalled that other aerodynamic apparatus may be employed alone or in combination with flaps for bringing about essentially the same result. If such other aerodynamic apparatus is employed alone, it may readily be substituted in each of Figs. 3, 5 and 6 for the flap apparatus shown therein. That is to say, instead of motor 25 being connected to actuate flaps 26, it may be connected to (1) vary the sweep back angle of the wings; (2) vary the angle of inclination of the wings about an athwartship axis; or (3) vary the lateral extension of the wings from the fuselage. Thus, in Fig. 6, for example, if motor 25 is reconnected to perform one of the enumerated functions, potentiometer 37 need only be wound to supply a signal proportional to the change produced in the bracketed portion of Equation 8 by the particular aerodynamic apparatus employed.

If, on the other hand, the apparatus includes both flaps and a device for performing one of the aforesaid enumerated functions, a separate motor for actuating the device is preferable, in which event a separate potentiometer type signal generator is driven thereby and electrically placed in series with the flap potentiometer and pick-off winding 32 of gyroscopic vertical 4 so that the changes in the airplane's lift vs. angle of attack characteristic caused by actuations of both said device and the flaps are accompanied by an appropriate modification of the pitch signal supplied to summing amplifier 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an airplane, reference means for providing a base line from which pitching movements of said airplane may be measured, adjusting means coupled to said reference means for adjusting said base line, aerodynamic apparatus operable to change the lift of said airplane for a given angle of attack thereof, and means coupling said aerodynamic apparatus to said adjusting means for providing an adjustment thereof jointly with the operation of said aerodynamic apparatus.

2. In an airplane having aerodynamic apparatus operable to change the configuration of said airplane in a manner to vary its lift for a given angle of attack thereof, reference means including a vertical gyroscope for providing a pitch attitude reference for said airplane, means coupled to said reference means and operable to adjust the pitch attitude reference provided thereby, and means for jointly operating said aerodynamic apparatus and reference adjusting means, whereby the pitch attitude reference of the airplane is changed simultaneously with changes in the airplane's lift vs. angle of attack characteristic.

3. In an airplane having aerodynamic apparatus operable to change the configuration of said airplane in a manner to vary its lift for a given angle of attack thereof, reference means including a vertical gyroscope for providing a pitch attitude reference for said airplane, means coupled to said reference means for adjusting the pitch attitude reference provided thereby, control means for operating said aerodynamic apparatus, and means coupling said control means to said reference adjusting means for adjusting said attitude reference in accordance with a predetermined function of the lift variation produced for said given angle of attack by the operation of said aerodynamic apparatus.

4. In an airplane, aerodynamic apparatus comprising airfoil means mounted for movement relative to the airplane's fuselage for varying the airplane's lift vs. angle of attack characteristic, reference means for providing a pitch attitude reference for said airplane, means coupled to said reference means for adjusting the pitch attitude reference provided thereby, control means coupled to said aerodynamic apparatus and operable to move said airfoil means, and means coupling said airfoil means to said adjusting means and responsive to said relative movement of the former for adjusting said attitude reference in accordance with a predetermined function of said movement, whereby the attitude reference is adjusted a predetermined amount for a given variation in said lift vs. angle of attack characteristic.

5. In an airplane, aerodynamic apparatus comprising airfoil means arranged to be selectively positioned with respect to the airplane's fuselage for varying the lift of the airplane for a given pitch attitude and air speed of said airplane, reference means for providing a pitch attitude reference for said airplane corresponding to said given attitude, means coupled to said reference means for adjusting said pitch attitude reference, control means coupled to said aerodynamic apparatus and operable to position said airfoil means from a given position thereof, and means coupling said airfoil means to said adjusting means and responsive to movement of the former for adjusting said attitude reference by an amount equal to the attitude change required of the airplane to prevent a change in the airplane's lift due to movement of said airfoil means from said given position.

6. In a control system by means of which an airplane having apparatus operable to change its aerodynamic configuration in a manner to vary its lift for a given angle of attack thereof may be controlled to maintain a given flight path notwithstanding the operation of said apparatus, means for providing a first signal dependent upon the vertical displacement of said airplane from said flight path, means defining a reference pitch attitude, signal generating means coupled to said attitude-defining means for supplying a second signal dependent upon the departure of said airplane from said reference pitch attitude, means coupled to said signal generating means and operable to bias said second signal output thereof, means for jointly operating said configuration-changing apparatus and said biasing means whereby to effectively change the reference pitch attitude of the airplane while changing the airplane's lift vs. angle of attack characteristic, and means connected to receive said first and second signals, for supplying a control signal proportional to the algebraic sum thereof.

7. In an airplane, aerodynamic apparatus comprising airfoil means mounted for movement relative to the airplane's fuselage for varying the airplane's lift vs. angle of attack characteristic, means for providing a first signal dependent upon the vertical displacement of said airplane from a predetermined flight path, attitude means including a signal generator for providing a second signal dependent upon the departure of said airplane from a predetermined pitch attitude, means operable to move said airfoil means, means coupling said airfoil means to said signal generator for biasing said second signal output of the latter in accordance with a predetermined function of the movement imparted to said airfoil, and signal-responsive utilization means connected to receive said first and second signals so as to respond to the algebraic sum thereof.

8. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for adjusting said reference pitch attitude in accordance with a predetermined function of the amount of extension of said flaps, and means connected to receive said signals for supplying a control signal output proportional to the algebraic sum thereof.

9. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps for providing a third signal in accordance with a predetermined function of the amount of extension of said flaps, means for subtracting said third signal from said second signal, and means connected to receive said first signal and the resultant second signal for supplying a control signal output proportional to the algebraic sum thereof.

10. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for adjusting said reference pitch attitude substantially in accordance with a predetermined variation caused in the airplane's angle of zero lift due to flap extension, and means connected to receive said signals for supplying a control signal output proportional to the algebraic sum thereof.

11. In a control system by means of which a flap-equipped airplane may be controlled to maintain a given flight path without experiencing lift transients due to flap extension, means for providing a first signal in accordance with the vertical displacement of the airplane from said given flight path, means for providing a second signal in accordance with departures of the airplane from a reference pitch attitude, said reference pitch attitude being the pitch attitude at which the airplane must fly in order to maintain a flight path parallel to said given flight path for zero flap extension and a given air speed, means coupled to the airplane's flaps and responsive to the extension thereof for varying said second signal substantially in accordance with a predetermined variation of the airplane's angle of zero lift due to said flap extension, and a summing device having its input connected to receive said second signal as varied and said first signal for providing an output control signal proportional to the algebraic sum of said input signals.

12. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for adjusting said reference pitch attitude in accordance with a predetermined function of the amount of extension of said flaps, means for varying said reference pitch attitude adjustment in dependence upon variations in the air speed of said airplane, and means connected to receive said signals for supplying a control signal output proportional to the algebraic sum thereof.

13. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for varying said reference pitch adjustment by an amount inversely proportional to the square of the airplane's air speed, and means connected to receive said signals for providing a control signal output proportional to the algebraic sum thereof.

14. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps for providing a third signal in accordance with a predetermined function of the amount of extension of said flaps, means for providing a fourth signal inversely proportional to the square of the air speed of said airplane, means for varying said second signal in respectively opposite senses in accordance with said third and fourth signals, and means connected to receive said first signal and the resultant second signal for supplying a control signal output proportional to the algebraic sum thereof.

15. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for adjusting said reference pitch attitude substantially in accordance with a predetermined variation caused in the airplane's angle of zero lift due to flap extension, timing means operable to gradually diminish the adjustment imparted to said reference pitch attitude a given amount in a preselected duration of time, means coupled to said flaps and responsive to the latter reaching a given amount of extension for operating said timing means, and means connected to receive said signals for supplying a control signal output proportional to the algebraic sum thereof.

16. In a control system by means of which a flap-equipped airplane may be controlled to maintain a given flight path without experiencing lift transients due to flap extension, means for providing a first signal in accordance with the vertical displacement of the airplane from said given flight path, means defining a reference pitch attitude, means for supplying a second signal in accordance with departures of the airplane from said reference pitch attitude, means coupled to the airplane's flaps and to said attitude defining means for adjusting said reference pitch attitude in accordance with a predetermined function of the amount of extension of said flaps, means rendered operative upon full flap extension for reducing the adjustment imparted to said reference pitch attitude by a preselected amount in accordance with a given function of time, and means connected to receive said signals for supplying a control signal output proportional to the algebraic sum thereof.

17. In an airplane control system responsive to combined pitch attitude and flight path displacement signals for controlling said airplane to travel at a given pitch attitude along a predetermined flight path, airfoil means positionable relative to the airplane's fuselage for changing the aerodynamic configuration of said airplane in a manner to vary the lift thereof for said pitch attitude, motive means for positioning said airfoil means, and means coupled to said motive means and responsive to the positioning of said airfoil means for biasing said combined signals to call for a pitch attitude change sufficient to prevent a displacement of the airplane from said flight path due to the lift change produced by said airfoil.

18. In an aircraft automatic control system responsive to combined pitch attitude and flight path displacement signals for controlling said craft to travel at a given pitch attitude along a predetermined flight path, flap means deflectable from a streamline position on the wings of said craft for changing the lift of said craft for said pitch attitude, and means responsive to the deflection of said flap means for biasing said combined signals to call for a pitch attitude change sufficient to prevent a displacement of the airplane from said flight path due to the lift change produced by said deflection.

References Cited in the file of this patent

UNITED STATES PATENTS

| | | |
|---|---|---|
| 2,415,429 | Kellogg et al. | Feb. 11, 1947 |
| 2,448,167 | Baak | Aug. 31, 1948 |
| 2,630,987 | Hauptman | Mar. 10, 1953 |
| 2,683,004 | Alderson et al. | July 6, 1954 |